United States Patent [19]
Betker et al.

[11] Patent Number: 6,052,766
[45] Date of Patent: Apr. 18, 2000

[54] POINTER REGISTER INDIRECTLY ADDRESSING A SECOND REGISTER IN THE PROCESSOR CORE OF A DIGITAL PROCESSOR

[75] Inventors: Michael R. Betker, Allentown; John S. Fernando, Coopersburg; Frank Lemmon, Allentown; Shaun P. Whalen, Wescosville, all of Pa.

[73] Assignee: Lucent Technologies Inc., Murray Hill, N.J.

[21] Appl. No.: 09/135,605

[22] Filed: Aug. 18, 1998

Related U.S. Application Data
[60] Provisional application No. 60/092,031, Jul. 7, 1998.

[51] Int. Cl.[7] ..................................................... G06F 12/00
[52] U.S. Cl. ........................ 711/200; 711/202; 711/211; 712/35; 712/217; 712/225
[58] Field of Search ....................... 395/800.23; 711/202, 711/211; 712/217, 16

[56] References Cited

U.S. PATENT DOCUMENTS

| | | | |
|---|---|---|---|
| 3,946,366 | 3/1976 | Edwards, Jr. ............................ | 711/211 |
| 4,907,147 | 3/1990 | Saito et al. ............................... | 712/217 |
| 5,239,633 | 8/1993 | Terayama et al. ....................... | 712/217 |
| 5,579,527 | 11/1996 | Chin et al. ................................ | 712/16 |
| 5,829,054 | 10/1998 | Ehlig et al. .............................. | 711/202 |

*Primary Examiner*—Meng-Ai T. An
*Assistant Examiner*—Nabil El-Hady

[57] ABSTRACT

A first register stores a value that can be used as a pointer to indirectly address a second register. The first register is referred to as a pointer register and the pointer as a register pointer. The second register may be a conventional register that stores a conventional register value (i.e., a data value or a pointer to a data value stored in external memory) or another pointer register. In certain embodiments, a pointer register can also be used to store conventional register values. Pointer registers of the present invention can be used to implement efficiently certain types of digital processing, such as circular buffers, vector processing, convolutional processing, and partitioned processing, using data in registers rather than memory.

19 Claims, 8 Drawing Sheets

POINTER REGISTER INDIRECTLY ADDRESSING A SECOND REGISTER IN THE PROCESSOR CORE OF A DIGITAL PROCESSOR

CROSS-REFERENCE TO RELATED APPLICATIONS

This application claims the benefit of the filing date of U.S. provisional application No. 60/092,031, filed on Jul. 7, 1998.

BACKGROUND OF THE INVENTION

1. Field of the Invention

The present invention relates to integrated circuits having digital processors, and, in particular, to the use of registers in the processor core of a digital processor.

2. Description of the Related Art

Conventional digital processors, such as digital signal processors and general-purpose microprocessors, are typically designed with a number of registers in the processor core that can be used by the programmer or compiler as needed. For example, some conventional registers may be dedicated to storing only data values; others may be dedicated to storing pointer values pointing to locations in memory outside of the processor core (i.e., "external memory") where data values may be stored; and still others may be capable of storing either data values or external-memory pointer values, as selected by the programmer. Thus, in these examples, the values stored in conventional registers are either data values or pointer values.

The term "external memory" may be used to refer to either on-chip memory or off-chip memory, but always to memory that is outside of the processor core. As used in this specification, the term "register" refers to hardware (e.g., a set of flip-flops or memory cells) in the processor core of a digital processor, where that hardware can store a value that can be read by an instruction that specifies a label identifying the location of the register (i.e., the register address). The processor core consists of the data path (functional units), register file, and associated control logic required to execute the instruction set defined for the processor. All memory used for storing programs and data are considered to be exterior to the processor core. All peripherals and clock sources are also external to the processor core.

Figure 1:
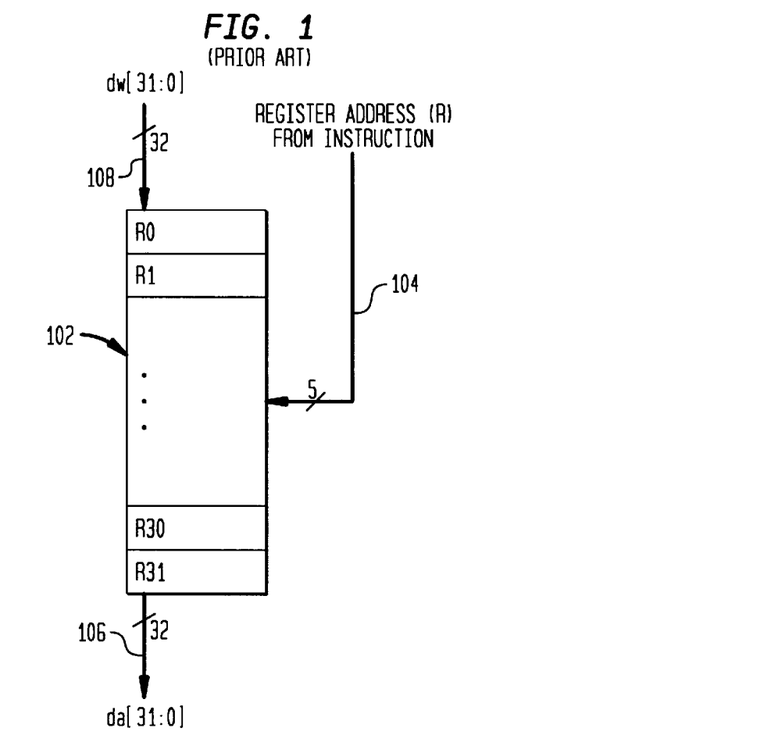
FIG. 1 shows how addressing is implemented for a conventional register.

FIG. 1 shows how addressing is implemented for a conventional register. The digital processor corresponding to FIG. 1 has a register file 102 consisting of 32 registers (labeled R0 through R31), each of which can hold a 32-bit value. Each register in the register file has a unique 5-bit register address that distinguishes it from the other 31 registers. For example, the 5-bit register address (00000) corresponding to the number 0 may be used to identify register R0, while the 5-bit register address (00001) corresponding to the number 1 may be used to identify register R1, and so on. A particular register is read by an instruction having a field that identifies the appropriate 5-bit register address via line 104. During a read operation, the register file's address decoding circuitry (not shown) enables the contents of the register (i.e., the value stored in the register) indicated by the register address to appear on line 106 as the read data from the register file (i.e., da[31:0]). In subsequent processing external to FIG. 1, the read value may be treated as a data value or as a pointer value. Similarly, during a write operation, the register file's address decoding circuitry enables the write data on line 108 (i.e., dw[31:0]) to be written into the register indicated by the register address.

Such conventional registers allow programmers to implement many different types of instructions. There are, however, certain types of processing, including certain types of repetitive operations, for which using conventional registers is inefficient.

SUMMARY OF THE INVENTION

The present invention is directed to the use of a register in a digital processor to hold a value that is treated as a pointer to another register in the digital processor. As used in this specification, the term "register pointer" refers to a value stored in one register that identifies the register address of another register, while the term "pointer register" refers to the first register, which can be used to store a register pointer. Thus, the present invention is directed to a digital processor having a pointer register, which can be used to store a register pointer. Depending on the design of the digital processor, a pointer register according to the present invention may be (a) dedicated to store only register pointers or (b) capable of storing either conventional register values (described earlier in this specification) or register pointers, as selected by the programmer.

In one embodiment, the present invention is a digital processor comprising a first register and a second register. The first register is adapted to store a pointer corresponding to a register address of the second register, such that the second register can be indirectly addressed using the pointer in the first register.

The present invention provides another level of indirection in referring to data values during instruction processing. In this case, the value stored in a particular type of register (i.e., a pointer register) stores a value that is used as a pointer to another register, which itself holds a value that may be either a data value or another pointer, e.g., to external memory. This additional level of indirection allows certain types of processing, including certain repetitive operations to be implemented more efficiently than is possible using conventional prior-art registers.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

As mentioned earlier, a pointer register according to the present invention may be either (a) a dedicated pointer register that can store only register pointers or (b) a non-dedicated pointer register that is capable of storing either conventional register values (described earlier in this specification) or register pointers, as selected by the programmer or compiler. These two different types of pointer registers are described separately in further detail in the following sections.

Dedicated Pointer Register

Figure 2:
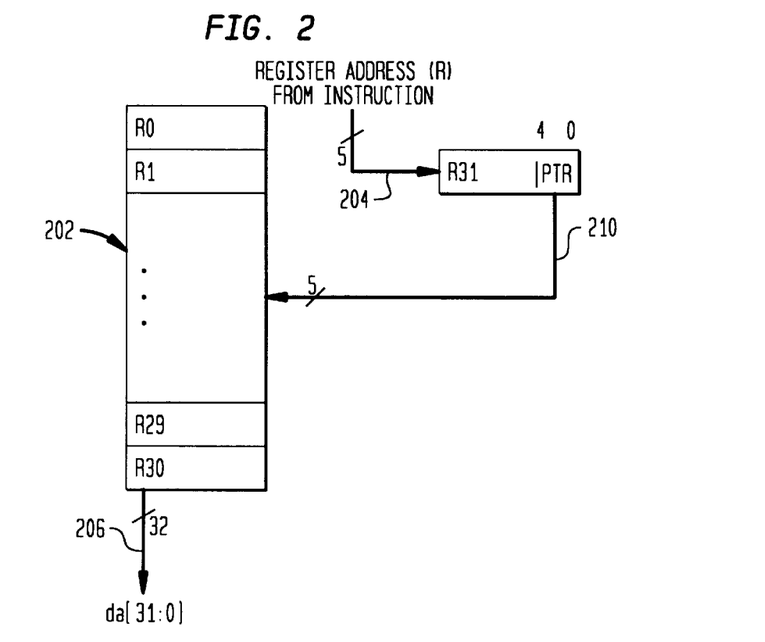
FIG. 2 shows a diagram of the processing involved in reading a value using a dedicated pointer register, according to one embodiment of the present invention in which the pointer register is dedicated to store only register pointers.

FIG. 2 shows a diagram of the processing involved in reading a value using a dedicated pointer register, according to one embodiment of the present invention in which the pointer register is dedicated to store only register pointers. The digital processor corresponding to FIG. 2 has a register file 202 consisting of 31 32-bit conventional registers (labeled R0 through R30 and similar to registers R0–R30 of FIG. 1) and a 32-bit pointer register (labeled R31). In this embodiment, pointer register R31 is dedicated to store only register pointers. Although pointer register R31 is shown physically separated from the other registers, from the programmer's perspective, the register is logically part of the register file. Thus, the same type of instruction may be used by a programmer to read pointer register R31 as is used to read any of the conventional registers R0–R30, differing only in the value (R) of the register address used to identify the register. By implementing pointer register R31 separately, it can be read faster in order to minimize the delay caused by the register-pointer function.

Pointer register R31 is read by an instruction that identifies the 5-bit register address (e.g., (11111) corresponding to the number 31) for pointer register R31 via line 204. Pointer register R31 stores a 5-bit register-pointer value (e.g., in its 5 LSBs R31[4:0]) that corresponds to the register address of one of the 31 conventional registers in register file 202. This 5-bit register pointer is read out from pointer register R31 via line 210 to read the 32-bit value stored in the corresponding register in register file 202, which 32-bit value is then read out via line 206, e.g., for subsequent conventional processing as either a data value or an external-memory pointer value, as described in the background section of this specification. Although not explicitly depicted in FIG. 2, the values stored in the conventional registers of register file 202 can also be read directly, without using pointer register R31, as was the case with the digital processor of FIG. 1.

Read Operations Using a Non-Dedicated Pointer Register

Figure 3:
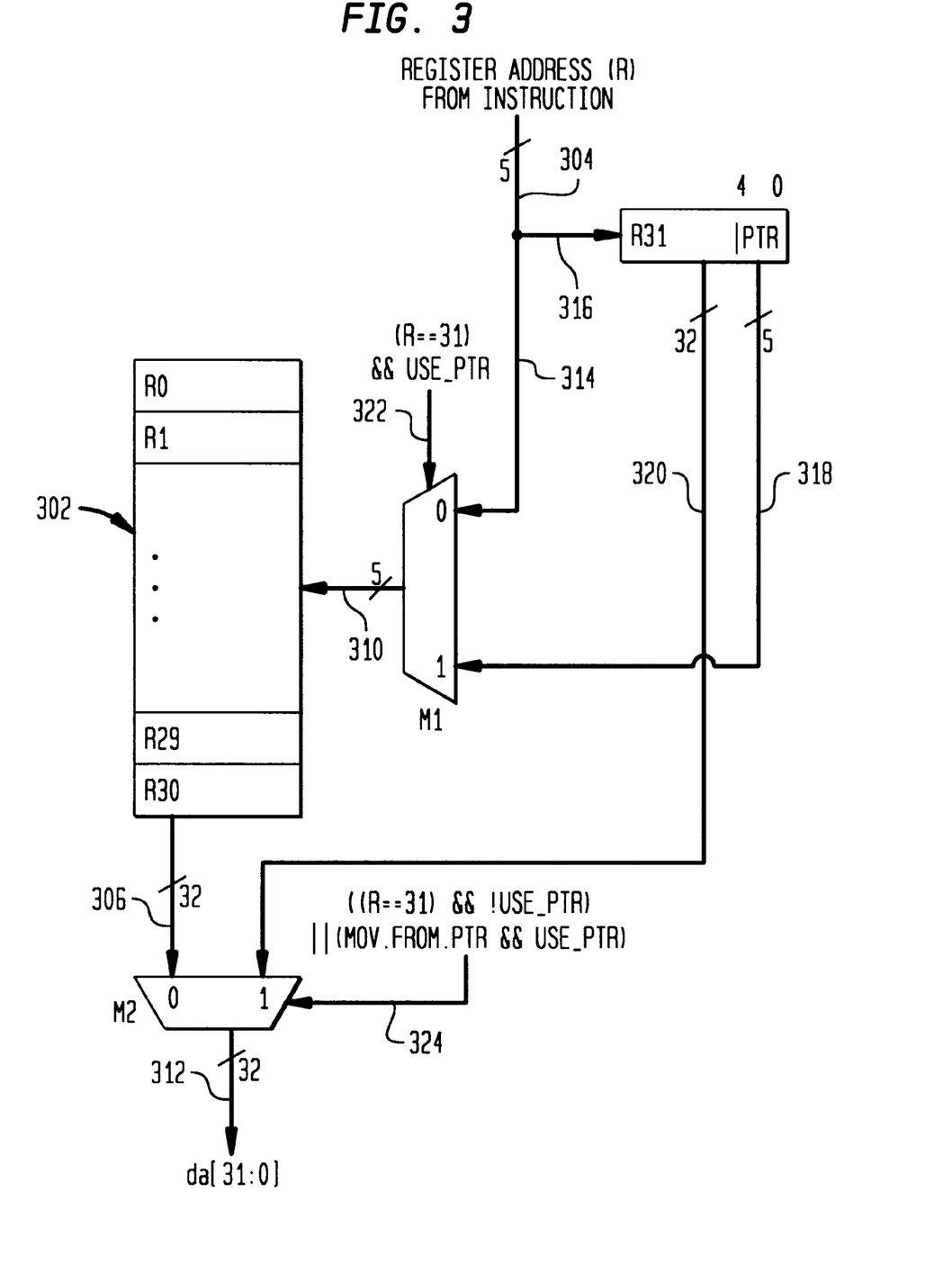
FIGS. 3 and 4 show diagrams of the processing involved in read and write operations, respectively, using a non-dedicated pointer register, according to an alternative embodiment of the present invention in which the pointer register is capable of storing either conventional register values or register pointers, as selected by the programmer.

FIG. 3 shows a diagram of the processing involved in read operations using a non-dedicated pointer register, according to an alternative embodiment of the present invention in which the pointer register is capable of storing either conventional register values or register pointers, as selected by the programmer. Similar to the case in FIG. 2, the digital processor corresponding to FIG. 3 has a register file 302 consisting of 31 32-bit conventional registers (labeled R0 through R30) and a 32-bit pointer register (labeled R31). In this embodiment, however, pointer register R31 is capable of storing either conventional register values or register pointers, as selected by the programmer.

The registers shown in FIG. 3 can be read by the following three different types of read operations:

(1) Direct Read of a Conventional Register: Directly reading a conventional 32-bit register value stored in one of the conventional registers R0–R30;

(2) Direct Read of a Pointer Register: Directly reading a conventional 32-bit register value stored in pointer register R31; and (3) Indirect Read of a Conventional Register Using a Pointer Register: Indirectly reading a conventional 32-bit register value stored in one of the conventional registers R0–R30 using a 5-bit register pointer stored in pointer register R31.

In all three of these operations, an instruction specifying the 5-bit value (R) of the register address on line 304 is used to read out a 32-bit value da[31:0] via line 312.

If the 5-bit value (R) of the register address on line 304 is between 0 and 30, then that value is applied to the logical 0 input of multiplexer (mux) M1 via line 314. If, however, the 5-bit value (R) of the register address on line 304 is equal to 31 (as determined by address decoding circuitry (not shown) for pointer register R31), then that value is applied via line 316 to read the bits stored in pointer register R31. In this case, the 5 LSBs R31[4:0] are read out via line 318 and applied to the logical 1 input of mux M1. At the same time, the full 32-bit value R31[31:0] is read out via line 320 and applied to the logical 1 input of mux M2.

Meanwhile, the 5-bit output from mux M1 is used as a register address to read the 32-bit value stored in the corresponding conventional register in register file 302 via line 310. The 32-bit value is then read out from register file 302 and applied to the logical 0 input of mux M2 via line 306. The 32-bit output from mux M2 via line 312 is the value read from one of the registers R0–R31 as a result (directly or indirectly) of the original register address on line 304.

As shown in FIG. 3, the selections of which input values are to be passed as output values by muxes M1 and M2 are based on the value (R) of the register address, the value of a logical flag called use_ptr, and a signal called mov.from.ptr asserted by a specific instruction. The logical flag use_ptr, which may be implemented as a bit in a control register, determines whether the bits in register R31 are to be treated as a conventional 32-bit register value or as a 5-bit register pointer. When the signal mov.from.ptr is asserted by the corresponding instruction, the signal value of mov.from.ptr may be assumed to correspond to a logical value of true; otherwise, the signal value of mov.from.ptr is assumed to correspond to a logical value of false.

In particular, if (R=31) and (use_ptr is true (e.g., 1)), then the control signal applied via line 322 will cause mux M1 to pass the value applied to its logical 1 input along line 318. Otherwise, mux M1 will pass the value applied to its logical 0 input along line 314. Similarly, if ((R=31) and (use_ptr is false (e.g., 0))) or if (mov.from.ptr and use_ptr are both true), then the control signal applied via line 324 will cause mux M2 to pass the value applied to its logical 1 input along line 320. Otherwise, mux M2 will pass the value applied to its logical 0 input along line 306. These three values (R, use_ptr, and mov.from.ptr) dictate which of the three different types of read operations defined earlier is implemented. These three different types of read operations are defined in more detail in the next three sections.

Direct Read of a Conventional Register

In order to implement the first type of read operation (i.e., direct read of a conventional 32-bit register value stored in one of the conventional registers R0–R30), the value (R) of the register address will be less than 31 (to identify one of registers R0–R30) and either use_ptr or mov.from.ptr (or both) should be false. In this case, the logical expression ((R==31) && use_ptr) will be false, causing mux M1 to pass the value applied to its logical 0 input. As such, the value (R) of the register address on line 304 will pass via line 314 through mux M1 via line 310 to register file 302, causing the corresponding conventional 32-bit register value to be read out via line 306 and applied to the logical 0 input to mux 2. The logical expression (((R==31) && !use_ptr)||(mov.from.ptr && use_ptr)) will also be false, causing mux M2 to pass the 32-bit value applied via line 306 to its logical 0 input as the output value on line 312, thereby completing the direct read of a conventional 32-bit register value stored in a conventional register.

Direct Read of a Pointer Register

In order to implement the second type of read operation (i.e., direct read of a conventional 32-bit register value stored in pointer register R31), the value (R) of the register address will be equal to 31 (to identify pointer register R31), use_ptr should be false, and mov.from.ptr can be either true or false. Since the value (R) of the register address is 31, the 5 LSBs R31[4:0] are read out from pointer register R31 via line 318 and applied to the logical 1 input of mux M1. At the same time, all 32 bits from pointer register R31 are read out via line 320 and applied to the logical 1 input of mux M2. As in the first case, the logical expression ((R==31) && use_ptr) will be false, causing mux M1 to pass the value applied to its logical 0 input. But since the value (R) of the register address is 31, it is not clear what value will be applied to the logical 0 input of mux M1 (it may depend on the particular implementation) and therefore it is not clear what value will appear on line 306 at the logical 0 input to mux M2. Since, however, the logical expression (((R==31) && !use_ptr)||(mov.from.ptr && use_ptr)) will now be true, mux M2 will pass the 32-bit value applied via line 320 to its logical 1 input as the output value on line 312, thereby properly completing the direct read of a conventional 32-bit register value stored in pointer register R31.

Indirect Read of a Conventional Register Using a Pointer Register

In order to implement the third type of read operation (i.e., read of a 5-bit register pointer stored in pointer register R31 for use in reading a conventional 32-bit register value stored in one of the conventional registers R0–R30), the value (R) of the register address will be equal to 31 (to identify pointer register R31), use_ptr should be true, and mov.from.ptr should be false. As in the previous case, since the value (R) of the register address is 31, the 5 LSBs R31[4:0] are read out from pointer register R31 via line 318 and applied to the logical 1 input of mux M1. At the same time, all 32 bits from pointer register R31 are read out via line 320 and applied to the logical 1 input of mux M2. In this case, however, the logical expression ((R==31) && use_ptr) will be true and mux M1 will pass the value applied to its logical 1 input (i.e., the 5 LSBs R31[4:0] which point to one of the conventional registers R0–R30). In this case, the register address R31[4:0] will pass via line 318 through mux M1 via line 310 to register file 302, causing the corresponding conventional 32-bit register value to be read out via line 306. The logical expression (((R==31) && !use_ptr)||(mov.from.ptr && use_ptr)) will also be false, causing mux M2 to pass the 32-bit value applied via line 306 to its logical 0 input as the output value on line 312, thereby properly completing the indirect read of a conventional 32-bit register value stored in one of the conventional registers R0–R30 using a 5-bit register pointer stored in pointer register R31.

In this third type of read operation, a conventional 32-bit register value stored in one of the conventional registers R0–R30 is read indirectly using the register pointer stored in pointer register R31. This ability to indirectly read other registers can be used to implement certain types of repetitive operations very efficiently, as demonstrated later in this specification in certain illustrative examples.

The full 32-bit value stored in pointer register R31 can be read two different ways. One way was described earlier as the second type of read operation, where the value (R) of the register address is 31 and use_ptr is false. Although use_ptr usually controls whether the pointer register R31 is used to store a register pointer or a conventional register value, it is nevertheless useful to be able to override the use_ptr setting in order to read the value stored in pointer register R31. As such, another way to read the full 32-bit value stored in pointer register R31 is to execute a mov.from.ptr instruction, when the value (R) is 31. In this case, the logical expression (((R==31) && !use_ptr)||(mov.from.ptr && use_ptr)) will be true, whether use_ptr is true or false, and mux M2 will pass the 32-bit value applied via line 320 to its logical 1 input as the output value on line 312. In this way, the mov.from.ptr instruction allows reading of the full 32-bit value stored in pointer register R31, without having to change the value of use_ptr.

Delay due to mux M1 results in extra delay when using pointer register R31 to store register pointers. This multiplexer delay can be reduced and even possibly eliminated, for example, by performing the selection in a pipeline stage prior to the register file read operation.

Write Operations Using a Non-dedicated Pointer Register

Figure 4:
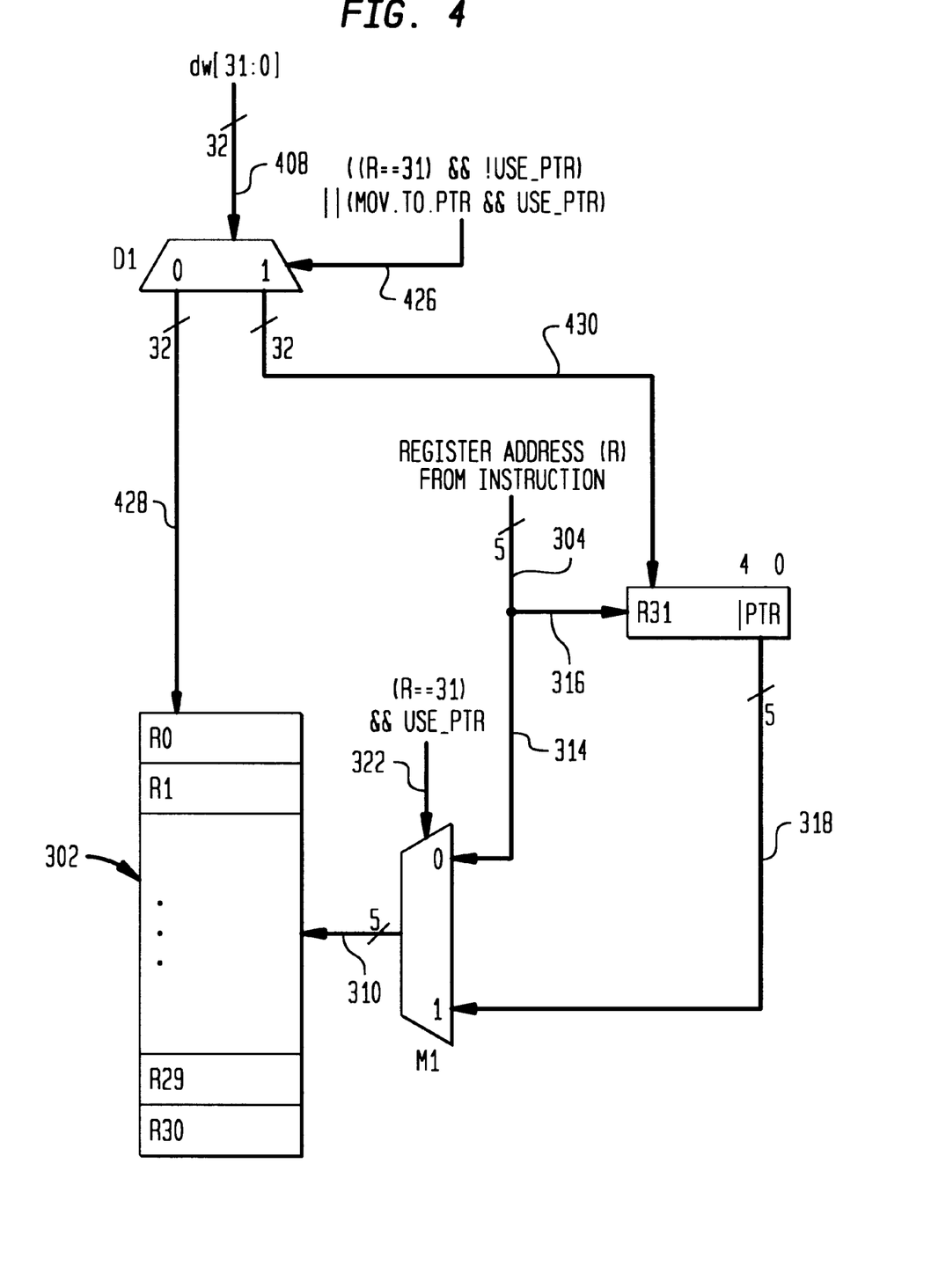

FIG. 4 shows a diagram of the processing involved in write operations using a non-dedicated pointer register, according to the embodiment of FIG. 3 in which the pointer register is capable of storing either conventional register values or register pointers, as selected by the programmer. The digital processor corresponding to FIG. 4 is the same as the digital processor of FIG. 3. As such, register file 302, pointer register R31, mux M1, and lines 304, 310, 314, 316, 318, and 322 in FIG. 4 are the same as corresponding elements shown in FIG. 3.

Data can be written to the registers shown in FIG. 4 by the following three different types of write operations:

(1) Direct Write to a Conventional Register: Directly writing a conventional 32-bit register value into one of the conventional registers R0–R30;

(2) Direct Write to a Pointer Register: Directly writing a 32-bit value into pointer register R31; and (3) Indirect Write to a Conventional Register Using a Pointer Register: Indirectly writing a conventional 32-bit register value into one of the conventional registers R0–R30 using a 5-bit register pointer stored in pointer register R31.

In all three of these operations, an instruction specifying the 5-bit value (R) of the register address on line 304 is used to write a 32-bit value dw[31:0] via line 408.

The 32-bit value to be written is applied to demultiplexer (demux) D1 via line 408. Depending on the value of the control signal applied to demux D1 via line 426, the input to demux D1 will be passed either to the logical 0 output of demux D1 and applied via line 428 to register file 302 or to the logical 1 output of demux D1 and applied via line 430 to register R31.

Meanwhile, if the 5-bit value (R) of the register address on line 304 is between 0 and 30, then that value is applied to the logical 0 input of mux M1 via line 314. If, however, the 5-bit value (R) of the register address on line 304 is equal to 31, then that value is applied via line 316 to read the value stored in pointer register R31. In this case, the 5 LSBs R31[4:0] are read out via line 318 and applied to the logical 1 input of mux M1. The 5-bit output from mux M1 is used as a register address to point to one of the conventional registers R0–R30 in register file 302 via line 310.

As shown in FIG. 4, the selection of to which output the input value to demux D1 is to be routed and the selection of which input value is to be passed as the output value by mux M1 are based on the value (R) of the register address, the value of the logical flag use_ptr, and the value of a signal called mov.to.ptr. The use of the signal mov.to.ptr, which may be asserted by a specific instruction, is described below. As was the case with the signal mov.from.ptr, when the signal mov.to.ptr is asserted by its corresponding instruction, the signal value of mov.to.ptr may be assumed to correspond to a logical value of true; otherwise, the signal value of mov.to.ptr is assumed to correspond to a logical value of false.

In particular, if (R=31) and (use_ptr is true), then the control signal applied via line 322 will cause mux M1 to pass the value applied to its logical 1 input. Otherwise, mux M1 will pass the value applied to its logical 0 input. Similarly, if ((R=31) and (use_ptr is false)) or if (mov.to.ptr and use_ptr are both true), then the control signal applied via line 426 will cause demux D1 to pass its input value to its logical 1 output. Otherwise, demux D1 will pass its input value to its logical 0 output. These three values (R, use_ptr, and mov.to.ptr) dictate which of the three different types of write operations defined earlier is implemented.

Direct Write to a Conventional Register

In order to implement the first type of write operation (i.e., direct writing of a conventional 32-bit register value into one of the conventional registers R0–R30), the value (R) of the register address will be less than 31 (to identify one of registers R0–R30) and either use_ptr or mov.to.ptr (or both) should be false. In this case, the logical expression (((R==31) && !use_ptr)||(mov.to.ptr && use_ptr)) will be false, causing demux D1 to pass the 32-bit value dw[31:0] applied to its input via line 408 to its logical 0 output on line 428. The logical expression ((R==31) && use_ptr) will also be false, causing mux M1 to pass the value applied to its logical 0 input to its output. As such, the value (R) of the register address on line 304 will pass via line 314 through mux M1 via line 310 to register file 302, causing the value dw[31:0] to be written into the corresponding conventional 32-bit register, thereby completing the direct writing of a conventional 32-bit register value into a conventional register.

Direct Write to a Pointer Register

In order to implement the second type of write operation (i.e., direct writing of a 32-bit value into pointer register R31), the value (R) of the register address will be equal to 31 (to identify pointer register R31), use_ptr should be false, and mov.to.ptr can be either true or false. In this case, the logical expression (((R==31) && !use_ptr) (mov.to.ptr && use_ptr)) will be true, causing demux D1 to pass the 32-bit value dw[31:0] applied to its input via line 408 to its logical 1 output on line 430. Since the value (R) of the register address on line 304 is 31, the value (R) will be passed via line 316 to register pointer R31, causing the 32-bit value dw[31:0] to be written into pointer register R31 via line 430, thereby completing the direct writing of a 32-bit value into pointer register R31. Note that the 32-bit value written into pointer register R31 may correspond to either a conventional 32-bit register value or a 5-bit register pointer, depending on the application selected by the programmer.

Indirect Write into a Conventional Register Using a Pointer Register

In order to implement the third type of write operation (i.e., reading a 5-bit register pointer stored in pointer register R31 for use in writing a conventional 32-bit register value into one of the conventional registers R0–R30), the value (R) of the register address will be equal to 31 (to identify pointer register R31), use_ptr should be true, and mov.to.ptr should be false. In this case, the logical expression (((R==31) && !use_ptr)||(mov.to.ptr && use_ptr)) will be false, causing demux D1 to pass the 32-bit value dw[31:0] applied to its input via line 408 to its logical 0 output on line 428. Since the value (R) of the register address on line 304 is 31, the value (R) will be passed via line 316 to register pointer R31, causing the 5-bit register pointer R31 [4:0] to be read from pointer register R31 via line 318 and applied to the logical 1 input of mux M1. The logical expression ((R==31) && use_ptr) will be true, causing mux M1 to pass the value applied to its logical 1 input to its output. As such, the 5-bit register pointer R31[4:0] on line 318 will pass through mux M1 via line 310 to register file 302, causing the value dw[31:0] to be written into the corresponding conventional 32-bit register, thereby completing the indirect writing of a conventional 32-bit register value into a conventional register using a 5-bit register pointer stored in pointer register R31.

In this third type of write operation, a conventional 32-bit register value is indirectly written into one of the conventional registers R0–R30 using the register pointer stored in pointer register R31. This ability to indirectly write to other registers can be used to implement certain types of repetitive operations very efficiently, as demonstrated later in this specification in certain illustrative examples.

A full 32-bit value can be written into pointer register R31 two different ways. One way was described earlier as the second type of write operation, where the value (R) of the register address is 31 and use_ptr is false. Although use_ptr usually controls whether the 32-bit value dw[31:0] is to be written into a conventional register or into pointer register R31, it is nevertheless useful to be able to override the use_ptr setting in order to write the 32-bit value into pointer register R31. As such, another way to write a full 32-bit value into pointer register R31 is to execute a mov.to.ptr instruction, when the value (R) is 31. In this case, the logical expression (((R==31) && !use_ptr)||(mov.from.ptr && use_ptr)) will be true, whether use_ptr is true or false, and demux D1 will pass the 32-bit value applied to its input via line 408 to its logical 1 output on line 430. In this way, the mov.to.ptr instruction allows writing a full 32-bit value into pointer register R31, without having to change the value of use_ptr.

Delay due to mux M1 results in extra delay when using pointer register R31 to store register pointers. This multiplexer delay can be reduced and even possibly eliminated, for example, by performing the selection in a pipeline stage prior to the register file write operation.

Figure 5:
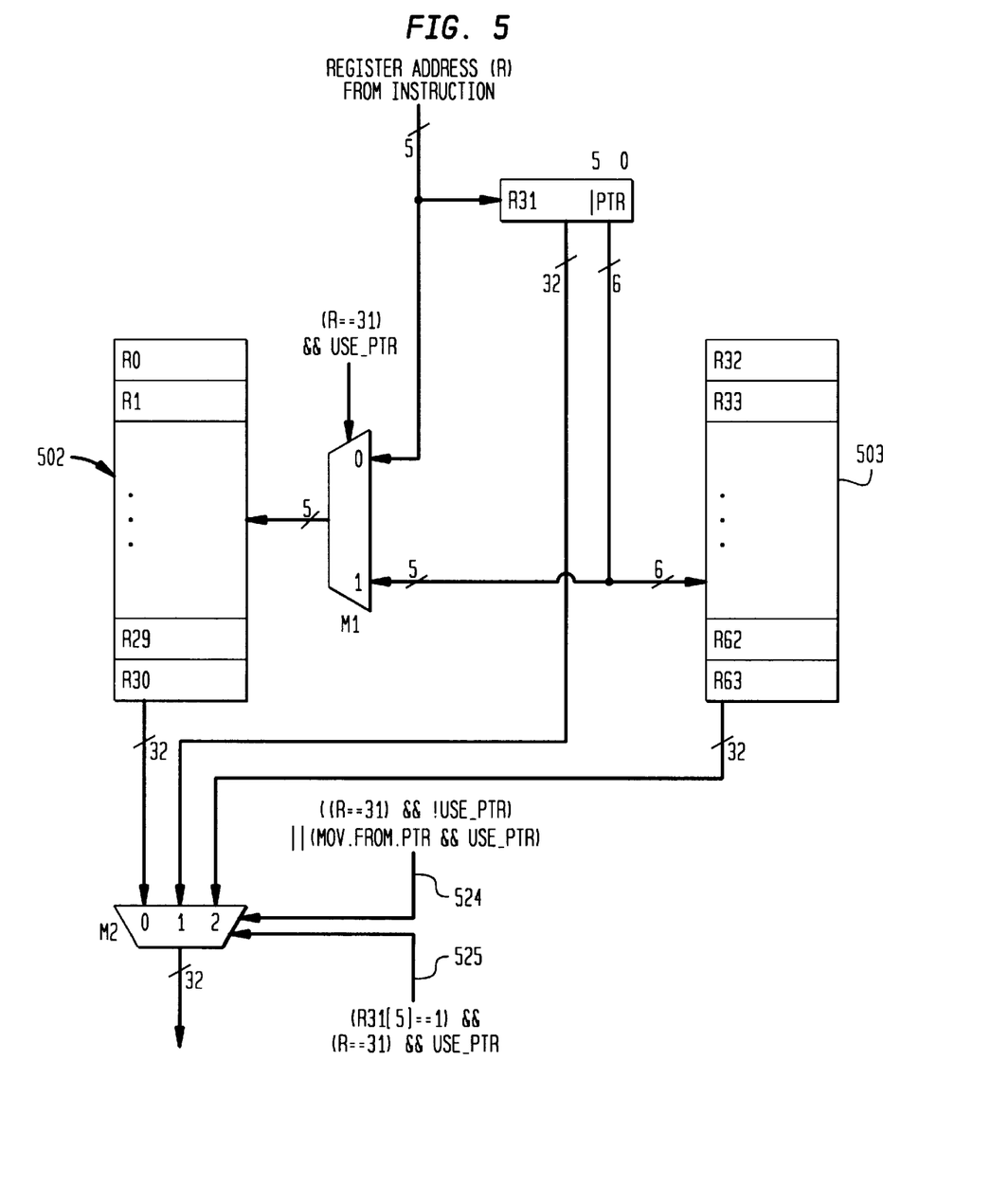
FIG. 5 shows a diagram of the processing involved in read operations using a non-dedicated pointer register, according to an alternative embodiment of the present invention in which the pointer register can be used to access either a register file or an extended register file, as selected by the programmer.

Read Operations Using a Non-dedicated Pointer Register To Access an Extended Register File FIG. 5 shows a diagram of the processing involved in read operations using a non-dedicated pointer register, according to an alternative embodiment of the present invention in which the pointer register can be used to access either a register file or an extended register file, as selected by the programmer. The processor of FIG. 5 is similar to the processor of FIG. 3, except that, in addition to register file 502 with its thirty-one 32-bit conventional registers R0–R30, the processor of FIG. 5 has an additional register file referred to as extended register file 503, which has thirty-two additional 32-bit conventional registers R32–R63. In addition, mux M2 of FIG. 5 receives two control signals to select one of three 32-bit inputs. In FIG. 5, pointer register R31 can be used to read data from either register file 502 or extended register file 503.

In the embodiment of FIG. 5, extended register file 503 can only be accessed via pointer register R31, which now has a 6-bit field (R31[5:0]) for storing register pointer values, since the register pointer values must accommodate the addresses for the additional 32 conventional registers in extended register file 503. Extended register file 503 is accessed when the register address (R) from the instruction specified pointer register R31, the use_ptr flag is true, and R31[5] (i.e., the MSB of the 6-bit pointer field) is 1. In all other cases, the original register file is accessed, either directly or via pointer register R31, as in FIG. 3.

Mux M2 receives three 32-bit inputs: the 32-bit value from register file 502 at the logical 0 input, the 32-bit value from pointer register R31 at the logical 1 input, and a 32-bit value from extended register file 503 at the logical 2 input. Two control signals determine which of the three inputs is passed as the output da[31:0] from mux M2: a first control signal via line 524 identical to the control signal in FIG. 3 and a second control signal via line 525 based on the logical expression ((R31[5]==1) && (R==31) && use_ptr). When the first and second control signals are both false, the logical 0 input is selected. When the first control signal is true and the second control signal is false, the logical 1 input is selected. When the first control signal is false and the second control signals is true, the logical 2 input is selected.

Read and Write Operations Using Two Non-dedicated Pointer Registers

Figure 6:
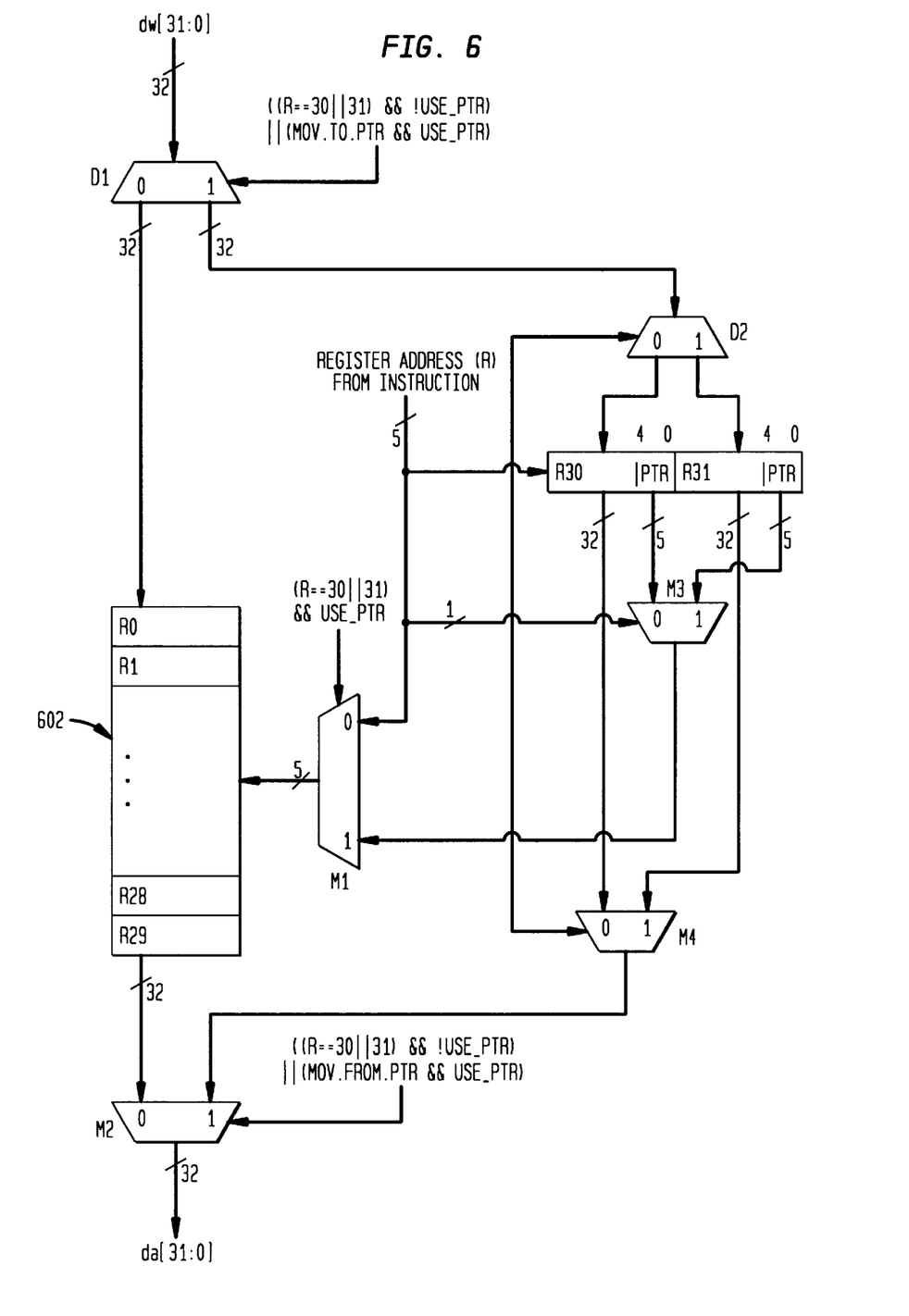
FIG. 6 shows a diagram of the processing involved in read and write operations using non-dedicated pointer registers, according to another alternative embodiment of the present invention in which two pointer registers are independently capable of storing either conventional register values or register pointers, as selected by the programmer.

FIG. 6 shows a diagram of the processing involved in read and write operations using non-dedicated pointer registers, according to another alternative embodiment of the present invention in which two pointer registers are independently capable of storing either conventional register values or register pointers, as selected by the programmer. Unlike the processor of FIGS. 3 and 4, which has only one pointer register R31, the processor of FIG. 6 has two 32-bit pointer registers R30 and R31, while register file 602 has 30 conventional 32-bit registers R0–R29.

For read operations, muxes M1 and M2 of FIG. 6 operate analogous to muxes M1 and M2 of FIG. 3, except that the control signals take into account the register address (R) for either of two pointer registers R30 and R31. Muxes M3 and M4 in FIG. 6 control whether the corresponding input values from pointer register R30 or pointer register R31 are passed to the logical 1 inputs of muxes M1 and M2, respectively. The control signal into muxes M3 and M4 is the LSB of the 5-bit register address, which will be 0 when the value (R) of the register address is 30 and 1 when the value (R) is 31.

Similarly, for write operations, demux D1 and mux M1 of FIG. 6 operate analogous to demux D1 and mux M1 of FIG. 6, except for the modification to the control signal to account for the two pointer registers R30 and R31. When writing to the pointer registers, demux D2 in FIG. 6 controls whether the write value dw[31:0] is written to pointer register R30 or pointer register R31. When writing to register file 602 using a register pointer, mux M3 in FIG. 6 controls whether the register pointer in pointer register R30 or the register pointer in pointer register R31 is used to identify the conventional register in register file 602 as the destination of the write value dw[31:0]. In both situations, the control signal into demux D2 and mux M3 is the LSB of the 5-bit register address, which will be 0 when the value (R) of the register address is 30 and 1 when the value (R) is 31.

Exemplary Applications of Pointer Registers

As indicated earlier, the ability of pointer registers to store register pointers—that is, values that point to other registers—can be exploited to implement certain types of processing efficiently.

Circular Buffers

As described in the background section, common programming practice uses registers to point to values in external memory. Thus, a register may be used as a pointer, where the register holds an address of a memory-resident value. It is advantageous to have the hardware support modifications to the register to facilitate accessing a sequence of array values in memory. The code segment shown below is part of a loop (iterated N times by the Do instruction) that allows the same instruction (i.e., R16=*R1 ++R7) to read values beginning at array_ptr and sequence through values with addresses array_ptr+stride_value, array_ptr+(2×stride_value), array_ptr+(3×stride_value), etc.

```
R1=array_ptr
    // load initial value
R7=stride_value
Do N {
   R16=*R1++R7
       // load value at address in R1, then add R7 to R1
   R17=R16×R16+R17
}
```

In this code segment, R1, R7, R16, and R17 represent values stored in the corresponding registers, and *R1 represents the value stored in external memory at the address identified by R1. The hardware steps to implement the load instruction are as follows:

1. Read register R1 and drive memory address (M bits, where M is usually between 20 and 32 bits).
2. Read register R7 and perform M-bit addition of R1+R7.
3. Write register R1 with new value at next clock.

Consider the implementation of a circular buffer, a common construct in digital signal processor (DSP) applications. The programmer defines a begin address in memory, an end address in memory, and an initial pointer value between the begin and end addresses as shown in the following code segment:

```
R0=array_begin
    // begin address
R15=array_end
    // end address
R1=array_ptr
    // load initial value
R7=stride_value
Do N {
   R16=*R1++R7
       // load value at address in R1, then add R7 to R1;
       if R1>R15, then R1=R0
   R17=R16×R16+R17
}
```

The semantics of operation ensures that when the pointer r1 goes past the end of the array (R15), R1 is automatically reset to the begin address stored in R10. Thus, the values in the array in external memory are accessed in circular fashion. The hardware steps to implement the load instruction with circular buffering enabled are as follows:

1. Read register R1 and drive memory address (M bits, where M is usually between 20 and 32 bits).
2. Read register R7 and perform M-bit addition of R1+R7.
3. Compare R1+R7 against R15: If(R1+R7)>R15, then R1=R0, else R1=R1+R7
4. Write register R1 with new value at next clock.

Implementing circular buffers using this conventional approach requires two M-bit adders to perform an M-bit addition and an M-bit comparison.

When arrays in external memory are repeatedly accessed, the same values are loaded into registers several times just before the value is required by a subsequent instruction. A significant amount of power is required for external memory access as opposed to a register access Therefore, if the values are repeatedly accessed from registers as opposed to memory, significant energy savings result. Moreover, since registers are typically specified by 5-bit or 6-bit values, rather than by M-bit values, where M is 20 or greater, the additions and comparisons for implementing a register-based circular buffer take less hardware and are much faster. It is also easier to implement circular buffering with no stride restrictions. The only restriction is that the array fits within the register file.

The register pointers of the present invention may be used to implement register-based array access, including circular buffers. The register pointer specifies a register address, rather than an external memory address. As described earlier in this specification, a register pointer is simply a pointer to another register. The following code segment shows how register pointers may be used:

// Set up the register pointer with the following fields:
// start is R20, end is R29, iteration stride is ITERSTRIDE, element stride is ELEMSTRIDE,
// type is WORD (16 bits), initial register pointed to is R20
R31=(20<<24)|(29<<16)|(ITERSTRIDE<<13)|(ELEMSTRIDE<<11)|(WORD<<8|20
set use_ptr
// set the use_ptr bit to true
Do N {
    R17=R31×R31+R17
}

Assume that an array of 10 values is already loaded into registers R20 through R29. The initial value of the register pointer R31 is set to the register number that holds the initial value of the array (e.g., R20). The instruction "R17=R31× R31" refers to a register pointer R31, which specifies the register that holds the value. The hardware steps to implement circular buffering using such a register pointer are as follows:

1. Read register R31
2. Read register [R31[5:0]] and perform 5-bit addition of R31[5:0]+R31[12:11], where R31[12:11] is the element stride.
3. Compare R31[5:0]+R31[12:11] against 29, such that:
   If R31[5:0]+R31[12:11]>29,
   then R31[5:0]=R31[31:24],
   else R31[5:0]=R31[5:0]+R31[12:11].
4. Write register R31[5:0] with new value at next clock.

Using pointer registers to store register pointers results in energy savings due to the replacement of external memory access by register access. The hardware needed to implement such processing is much less than that for external memory-based array access. Although the size of an array is limited when mapped to a register file, in many applications, such as the application of filter coefficients in speech coding, the sizes of the arrays are small and can effectively utilize pointer registers.

Figure 7:
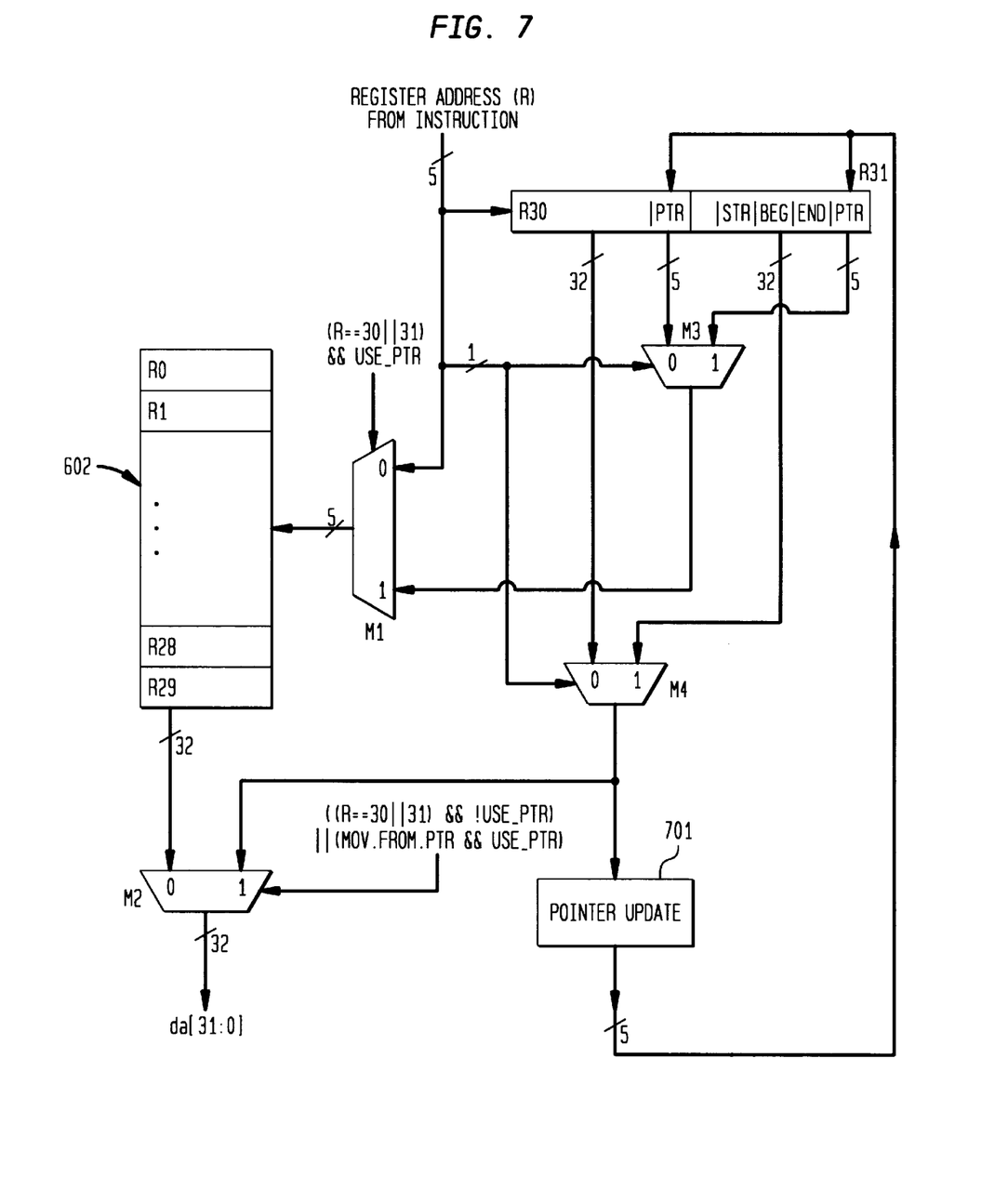
FIG. 7 shows a diagram of one possible implementation of circular buffering using the embodiment of FIG. 6.

FIG. 7 shows a diagram of one possible implementation of circular buffering using the embodiment of FIG. 6. The only difference between FIGS. 6 and 7 is the addition in FIG. 7 of pointer update block 701 and the 32-bit line leading to block 701 from mux M4 and the 5-bit lines leading from block 701 to pointer registers R30 and R31. Unlike in external memory-based circular buffering, the 32-bit pointer register R31 contains the 5-bit values for the stride (STR), the register addresses corresponding to the beginning (BEG) and end (END) of the circular buffer in addition to the register pointer (PTR). The other 12 bits R31[31:20] are not used.

An instruction using R30 or R31 as an operand causes the 5-bit register pointer PTR to be read from pointer register R30 or R31 through muxes M3 and M1 and used to identify one of the conventional registers in register file 602 corresponding to the circular buffer (e.g., R20–R29 in the earlier example). At the same time, the full 32-bit value is read from pointer register R30 or R31 through mux M4 to pointer update block 701, which increments the 5-bit register pointer PTR by the 5-bit stride STR, compares the result to the end of the circular buffer (END), and if appropriate resets the register pointer PTR to the beginning of the circular buffer (BEG). The updated register pointer PTR is then written back to the 5 LSBs in pointer register R31. Since pointer registers R30 and R31 are implemented outside of register file 602, they can have additional write ports to enable updating the register pointers (PTR), while simultaneously updating the destination register specified in the instruction.

Vectors

Another application for the use of pointer registers is to enable efficient storage and operation on vectors stored in registers. A vector is a one-dimensional array of operands of a given type. For example, a sequence of ten 16-bit signed integers is an example of a vector. Vector notation is a concise, efficient means of expressing a series of operations on a vector. For this reason, vector instructions and vector operands have a long history in supercomputer architectures. Historically, processor architectures have stored vectors in both external memory and in registers. The Cray supercomputer architecture and many others specify that vectors are stored in a set of dedicated registers. These registers are only used for storing vector operands and are not used for storing scalar (non-vector) operands. Furthermore, the vector instructions in these architectures implicitly specify the vector registers as operands. One disadvantage of dedicated vector registers is that the storage space in the vector register file cannot be shared for scalar operations. Furthermore, vector registers typically have a fixed length. In other words, the vector register can hold a fixed number of operands of a given size. For example, the Cray-1 supercomputer had eight vector registers, each capable of holding sixty-four 64-bit elements. In some architectures, the vector registers can be configured to a small number of different lengths depending on the size of the operands. When the vector length is less than the vector register length, the unused space is wasted. For example, in the Cray-1 supercomputer, if a vector instruction operates on two 32-element vectors, each of the two operands must occupy a full vector register, thereby wasting between them the equivalent of an entire vector register.

In addition to the wasted storage in the processor, traditional vector registers can only support simple vector access patterns, since the registers are named directly in the instruction. Some algorithms are naturally expressed in vector form, but cannot be implemented with traditional vector registers. One such algorithm is the "sliding window" for convolution. In this algorithm, the first vector instruction operates on element 0 of the two operands, then on element 1, and so forth. For the second iteration, the vector instruction operates on element 0 of one operand and on element 1 of the second operand, followed by element 1 of the first operand and element 2 of the second operand, and so forth. Thus, the first vector is a window that "slides" over the second vector. This access pattern cannot be implemented with traditional vector registers, since they do not provide a mechanism to address an arbitrary element as the first element of the vector operation.

Figure 8:
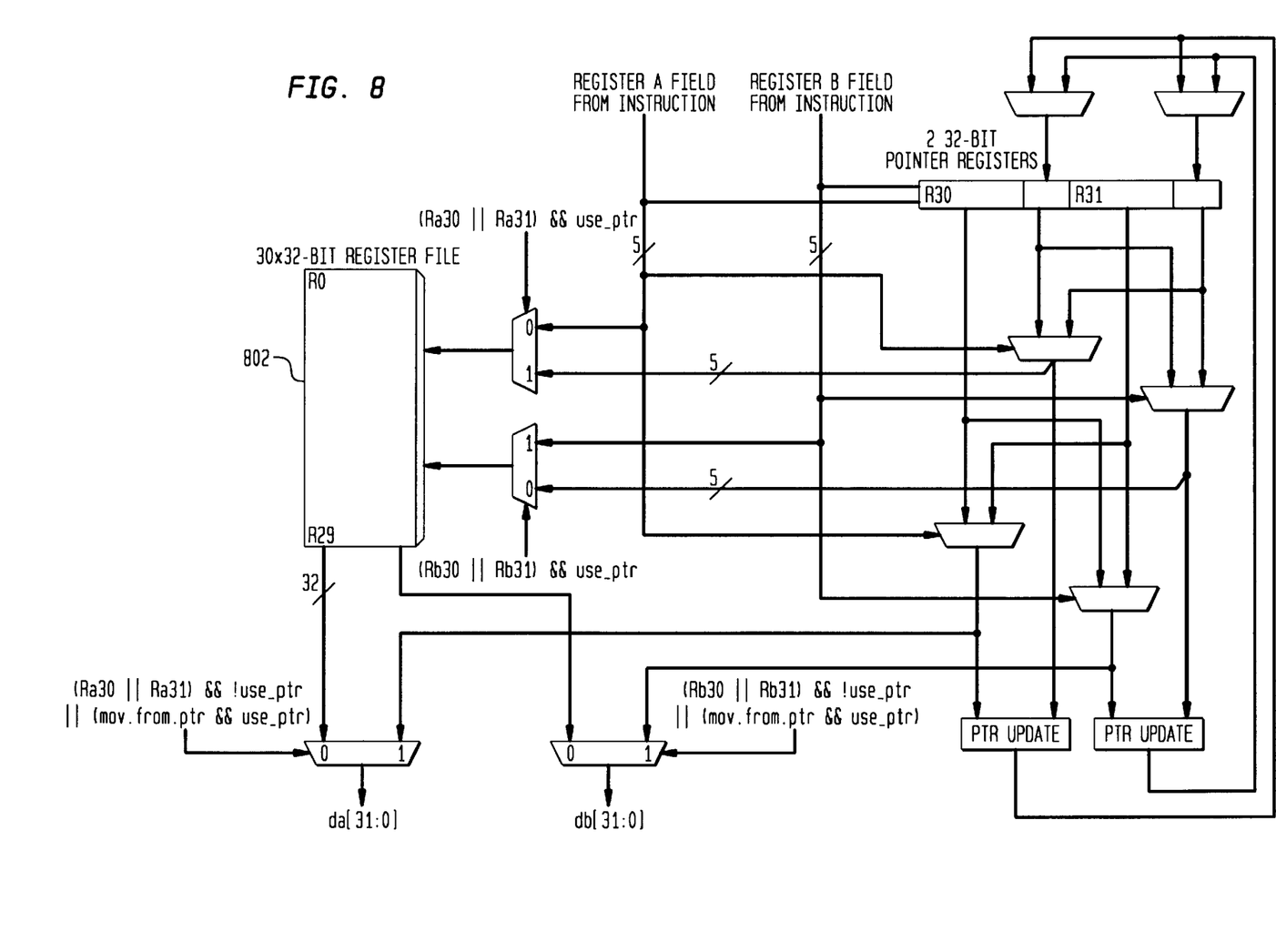
FIG. 8 shows a possible implementation of a two-read-port, one-write-port register file with two pointer registers that can be used to implement the sliding window of convolutional processing.

FIG. 8 shows a possible implementation of a two-read-port register file with two pointer registers that can be used to implement the sliding window of convolutional processing. In this implementation, register file 802 stores the elements of two different vectors, with register pointers in pointer registers R30 and R31 being used to address independently the elements of the two vectors. By controlling the initial values of the register pointers for each vector instruction and updating those register pointers by the corresponding pointer update blocks, one vector can slide over the second vector in successive vector instructions. At each iteration within a vector instruction, two 32-bit elements da[31:0] and db[31:0], one for each vector, are read from register file 802 for subsequent processing (not shown). In general, according to the present invention, register files can have one, two, or more read ports and one, two, or more write ports, where read ports and write ports are types of register file access ports and the number of read ports can be, but need not be the same as the number of write ports.

A more general format for a 32-bit pointer register could include fields for sub-word operand types and more stride information. For example, the following fields could be defined for a pointer register:

CURPTR: the byte index of the first element of the register-resident vector to be processed when a vector instruction issues using this pointer register as an operand (8 bits)

TYPE: the type of each vector element in the vector; one of byte, unsigned byte, half-word, unsigned half-word, word, and unsigned word (3 bits)

ELEMSTRIDE: a signed value indicating the stride through the vector in terms of the number of elements of size indicated by type. This field may have values of −2, −1, 1 and 2 (i.e., always nonzero) (2 bits)

ITERSTRIDE: a signed value indicating the stride through a vector of output samples being computed over multiple vector instructions; for example, computing the result of a convolution of a filter with a vector of input samples. The value is in terms of the number of elements of size indicated by type. This field may have values of −4, −3, −2, −1, 0, 1, 2, and 3 (3 bits)

START: the index of the first element in the vector (8 bits)

END: the index of the last element in the vector (8 bits)

Whenever a vector instruction is issued using a pointer register operand, the CURPTR field is post-updated by ITERSTRIDE. If CURPTR exceeds END for a positive ITERSTRIDE or START for a negative ITERSTRIDE (after being post-updated), then CURPTR will be set to START or END, respectively.

As the vector instruction executes, the vector control uses CURPTR as the initial vector index and post-updates this local index by ELEMSTRIDE to select the next vector element for processing. If this local index exceeds END for a positive ELEMSTRIDE or START for a negative ELEMSTRIDE (after being post-updated), then the local index will be set to START or END, respectively.

The current pointer field CURPTR of a pointer register is aligned according to the size of the TYPE field of the pointer register.

The semantics of operation are very similar to conventional vector register access without requiring special vector registers.

Using Pointer Registers For Partitioned Register Files

A register pointer logically points to a single conventional architectural register in the register file. It is common practice in high-performance processors to support operations on packed data in a single conventional register. For example, although the width of a conventional register may be 32 bits (i.e., one word), there are often operations that can treat the 32-bit value as two 16-bit values or four 8bit values. These operations (or opcodes) use conventional registers to hold packed data and partitioned functional units to operate on multiple packed data elements in a single operation.

The access pattern for a circular buffer of packed 16-bit or 8-bit values usually has a stride of 2 bytes or 1 byte, respectively. If a register pointer simply points to a conventional register, the minimum stride would be 4 bytes. This would force a circular buffer in the register file to store one 8-bit or 16-bit element per conventional register, thereby wasting 2 or 3 bytes and preventing the efficient utilization of a partitioned functional unit.

If the stride is in terms of bytes (rather than full registers), then circular buffers of sub-word elements can make the most efficient use of the register file. Furthermore, partitioned functional units may then process multiple elements per cycle. However, simply making the stride match the element size does not match all of the requirements of a circular buffer. A circular buffer data structure implicitly specifies a sequence in which the accesses are to be performed. Since the partitioned functional unit operates on multiple elements of a register, at the beginning of the circular buffer, it will operate on some elements from the start of the buffer and some from the end of the buffer (assuming that the start of the buffer is not aligned on a register boundary). Similarly, at the end of the buffer, the partitioned functional unit will operate on some elements from the end of the buffer and some from the start of the buffer. Clearly, this is unacceptable for correct operation.

To correct the problem, the register pointer byte offset can be used to control which bytes of a register are updated with the result from a partitioned functional unit. When the circular buffer operation is initiated (e.g., with the DO operation), the byte offset indicates which sub-units of the initial destination register should be written even though the partitioned function unit has performed the operation on all of the sub-units of the operand registers. When the register pointer wraps at the end of the circular buffer, the byte offset of the end pointer is used to control which sub-elements of the register are updated. After wrapping, the byte offset of the begin pointer is used to control which sub-elements of the register are updated. Finally, when the circular buffer operation is ending (e.g., when the DO-loop count has expired), the byte offset of the starting register pointer is used to indicate which sub-elements of the register are updated.

Figure 9:
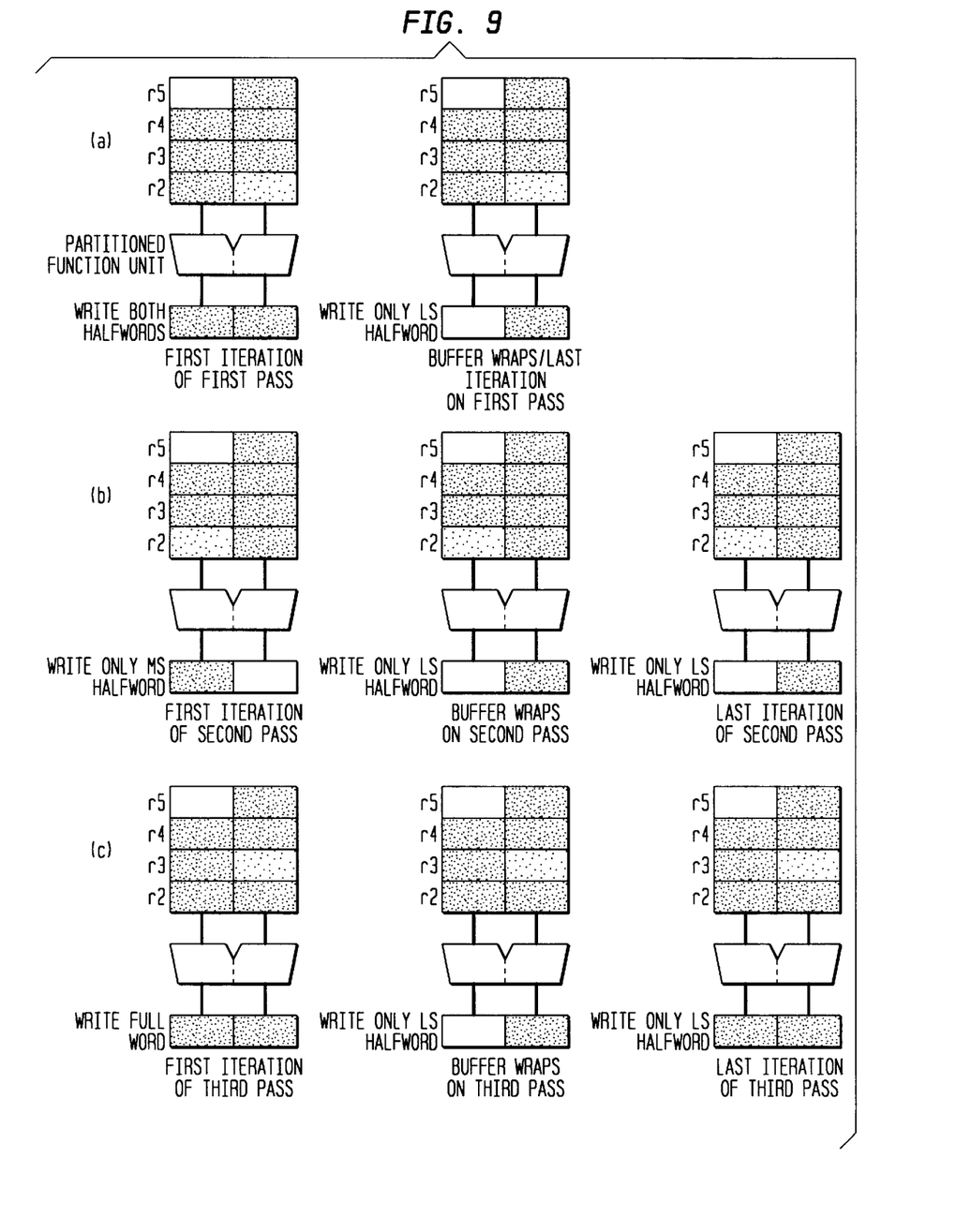
FIGS. 9(A)–(C) represent examples of circular buffer behavior in a partitioned datapath.

FIGS. 9(A)–(C) represent examples of circular buffer behavior in a partitioned datapath. In these examples, the circular buffer has 2-byte elements (i.e., half-words) and the length of the buffer is seven half-words, where the buffer begins with the least significant half-word of register R2 and ends with the least significant half-word of register R5. FIGS. 9(A)–(C) show the behavior when writing the results of the circular buffer operations for three passes through the circular buffer. Each pass through the circular buffer includes a first iteration, an iteration where the end pointer is reached, an iteration for the begin pointer (optionally), and a last iteration.

In general, on the first iteration, all of the bytes that are greater than or equal to the byte offset of the register pointer are written. As shown in FIG. 9(A), on the first iteration, since the register pointer is set to the beginning of the circular buffer and the beginning is aligned on a register boundary, all four bytes are written. However, for the second pass shown in FIG. 9(B), the first-iteration register pointer is not aligned and thus, only the most significant half-word of the result is written. For the third pass shown in FIG. 9(C), the first-iteration register pointer is again aligned, so all four bytes are written.

For subsequent iterations, until the end pointer is reached, the entire register is updated. When the end pointer of the circular buffer is reached, only the bytes that are less than the byte offset of the end pointer are written. As shown in FIGS. 9(A)–(C), for all passes, this is the least significant half-word of register R5.

When the end pointer is reached, the buffer wraps and the register pointer is set to the begin pointer. If the operation on the begin pointer is not the last iteration, then only the bytes that are greater than or equal to the byte offset of the begin pointer are written. In the example of FIGS. 9(A)–(C), the begin pointer is aligned on the register boundary and thus, in FIG. 9(C), where the begin pointer operation is not the last iteration, both half-words of register R2 are written.

However, in FIG. 9(B), the begin pointer is reached in the last iteration. In this case, only the least significant half-word at the begin pointer is written since the most significant half-word was written on the first iteration. In general, on the last iteration, only the bytes less than the byte offset of the register pointer on the first iteration are written. This would be true on a fourth pass through the buffer where the last iteration would write only the least significant half-word of register R2.

The present invention has been described in the context of pointer registers that store register pointers that point to conventional registers. It will be understood that, in other implementations, a register pointer stored in one pointer register may point to another pointer register. As such, the number of levels of indirection in reading and writing data can be increased even further.

The present invention has been described in the context of digital processors that have a total of thirty-two 32-bit registers, where one or two or those registers are pointer registers. It will be understood that the present invention may be implemented in other digital processors having more or less than 32 total registers, more than two pointer registers, and/or registers having more or fewer than 32 bits.

The present invention has been described in the context of pointer registers that are implemented physically separated from register files containing conventional registers, but treated logically as if the pointer registers were part of register files by addressing the pointer registers using the same name space as is used for the conventional registers (e.g., the same 5-bit field in an instruction is used to address either a conventional register or a pointer register). It will be understood that the present invention can also be implemented in other permutations, including:

Pointer registers that are (1) physically separated from register files of conventional registers and (2) addressed using a different name space (e.g., a different instruction field);

Pointer registers that are (1) physically part of register files that also contain conventional registers and (2) addressed using the same name space; and Pointer registers that are (1) physically part of register files that also contain conventional registers, but (2) addressed using a different name space.

In addition, different implementations of the register pointer access and indirect access to a register would be variations on the register pointer concept of the present invention. For example, the register pointer access could be implemented by having a separate pointer register file. This pointer register file would duplicate the pointer field of the register pointer to enable faster access to the pointer for the initial indirection and independent access for simultaneously updating the pointer while reading the indirectly pointed-to register. Another example would be to cache the most recently used register pointers in a content-addressable memory. This would also give faster access to the pointer for the indirection and enable simultaneous reading of the pointed-to register while updating the pointer. A different programmer's model that addresses the register pointers as registers outside of the register file is another variation of the register pointer concept.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An integrated circuit having a digital processor comprising a first register and a second register, wherein the first and second registers are located inside a processor core of the digital processor and the first register is adapted to store a pointer corresponding directly to a register address of the second register without having to be converted through a memory space corresponding to memory located outside of the processor core, such that the second register can be indirectly addressed using the pointer in the first register, wherein:

the first register is adapted to selectively store the pointer, a data value, or a memory address in the memory space; and the second register is adapted to selectively store a data value or a memory address in the memory space.

2. The invention of claim 1, wherein the first register is a pointer register and the second register is part of a register file.

3. The invention of claim 2, wherein the pointer register is implemented separate from the register file.

4. The invention of claim 2, wherein the pointer register is implemented as part of the register file.

5. The invention of claim 2, wherein the pointer register is addressed using a name space identical to a name space for the register file.

6. The invention of claim 2, wherein the pointer register is addressed using a name space different from a name space for the register file.

7. The invention of claim 2, further comprising an extended register file having one or more additional registers that can be accessed via the pointer register.

8. The invention of claim 1, wherein the first and second registers are pointer registers and the second register is adapted to store a pointer corresponding to a register address of a third register, such that the third register can be indirectly addressed using the pointer in the first register and the pointer in the second register.

9. The invention of claim 1, wherein the digital processor further comprises a first multiplexer configured to receive a first input corresponding to a register address from an instruction and a second input corresponding to the pointer from the first register and to generate an output corresponding to the register address of the second register.

10. The invention of claim 9, wherein the digital processor further comprises a second multiplexer configured to receive a first input corresponding to a value stored in the second register and a second input corresponding to a value stored in the first register and to generate an output corresponding to a data read instruction.

11. The invention of claim 9, wherein the digital processor further comprises a first demultiplexer configured to receive an input corresponding to a value to be written into one of the first and second registers and to selectively generate one of a first output configured to pass the value to be stored to the first register and a second output configured to pass the value to be stored to the second register.

12. The invention of claim 9, wherein the first multiplexer is selectively controlled based in part on a logical flag that determines whether or not to use the pointer stored in the first register to address the second register.

13. The invention of claim 9, wherein the digital processor further comprises a third register adapted to store a pointer corresponding to the register address of the second register, such that the second register can be indirectly addressed using the pointer in the third register.

14. The invention of claim 13, wherein the digital processor further comprises a second multiplexer configured to receive a first input corresponding to the pointer from the first register and a second input corresponding to the pointer from the third register and to generate an output corresponding to the second input to the first multiplexer.

15. The invention of claim 1, wherein:

the second register is configured as part of a circular buffer;

the first register is configured to store a stride value, a begin value, and an end value for the circular buffer; and the digital processor further comprises a pointer update function adapted to update the pointer in the first register using the stride, begin, and end values to sequentially point to different parts of the circular buffer.

16. The invention of claim 15, wherein the circular buffer stores packed data processed by a partitioned functional unit.

17. The invention of claim 1, wherein the digital processor further comprises a third register and a fourth register, wherein the third register is adapted to store a pointer corresponding to a register address of the fourth register, such that the fourth register can be indirectly addressed using the pointer in the third register.

18. The invention of claim 17, wherein:

the second register is configured as part of a first circular buffer;

the first register is configured to store a stride value, a begin value, and an end value for the first circular buffer;

the fourth register is configured as part of a second circular buffer;

the third register is configured to store a stride value, a begin value, and an end value for the second circular buffer; and the digital processor further comprises:

a first pointer update function adapted to update the pointer in the first register using the stride, begin, and end values in the first register to sequentially point to different parts of the first circular buffer; and a second pointer update function adapted to update the pointer in the third register using the stride, begin, and end values in the third register to sequentially point to different parts of the second circular buffer.

19. The invention of claim 18, wherein:

the second and fourth registers are part of a register file having at least two access ports; and control of the first circular buffer is independent of control of the second circular buffer.

* * * * *